United States Patent [19]

Buchmeier et al.

[11] Patent Number: 4,820,417
[45] Date of Patent: Apr. 11, 1989

[54] USE OF CITRIC ACID PARTIAL ESTERS FOR THE EXTRACTION OF IRON

[75] Inventors: Willi Buchmeier; Ralf Kehl, both of Duesseldorf; Werner Schwab, Langenfeld, all of Fed. Rep. of Germany

[73] Assignee: Henkel Kommanditgesellschaft auf Aktien, Duesseldorf, Fed. Rep. of Germany

[21] Appl. No.: 153,174

[22] Filed: Feb. 8, 1988

[30] Foreign Application Priority Data

Feb. 23, 1987 [DE] Fed. Rep. of Germany ....... 3705721

[51] Int. Cl.$^4$ .............................................. B01D 11/00
[52] U.S. Cl. ...................................... 210/638; 210/634
[58] Field of Search ................. 210/634, 638; 423/139

[56] References Cited

U.S. PATENT DOCUMENTS 4,670,230  6/1987  Watanabe et al. .................... 423/98

FOREIGN PATENT DOCUMENTS 2404185  2/1983  Fed. Rep. of Germany .

OTHER PUBLICATIONS

Ullmanns Encyklopädie der technischen Chemie, 1983, pp. 601–626.
Chemische Technologie, Mettallurgie, 1973, pp. 306–331.
Erzimetall 35, 1982, pp. 534–539.
"Topics in Non-Ferrous Extractive Metallurgy", Monhemius, pp. 105–130.
Handbook of Solvent Extraction, Thorsen, pp. 709–716.
Hydrometallurgy, 1976/77, pp. 275–284.

Primary Examiner—Frank Spear
Attorney, Agent, or Firm—Ernest G. Szoke; Wayne C. Jaeschke; Henry E. Millson, Jr.

[57] ABSTRACT

Citric acid partial esters corresponding to the following general formula

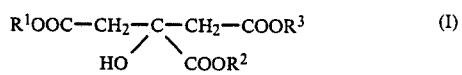

in which $R^1$, $R^2$ and $R^3$ represent hydrogen or a straight-chain or branched $C_4$-$C_{20}$ alkyl radical or a metal atom, with the proviso that at least one but at most two of the substituents $R^1$, $R^2$ and $R^3$ represent such an alkyl radical, or mixtures of the citric acid partial esters corresponding to general formula (I), are used for the extraction of iron from aqueous solutions.

16 Claims, 5 Drawing Sheets

USE OF CITRIC ACID PARTIAL ESTERS FOR THE EXTRACTION OF IRON

BACKGROUND OF THE INVENTION

1. Field of the Invention

This invention relates to the use of partial esters of citric acid and of mixtures of citric acid partial esters for the selective liquid/liquid extraction of iron from aqueous acidic solutions.

2. Statement of Related Art

The recovery of zinc metal suitable for technical purposes is carried out in by far the majority of cases by hydrometallurgical methods. The recovery process is normally carried out by desulfurizing the crude ores containing zinc and, in smaller quantities, other metals by roasting. The metal oxides left after roasting are dissolved hydrometallurgically with dilute sulfuric acid. Maximum recovery of all the valuable metals present in the crude ore (copper and cadmium besides zinc) requires digestion conditions under which iron is co-dissolved. However, since iron ions interfere with the electrolytic recovery of zinc, they have to be removed from the zinc sulfate solution before the zinc electrolysis process. In the industrial processes used at the present time, iron is precipitated from electrolysis solutions such as these. In these processes, the iron is precipitated as jarosite, as goethite, or as hematite (cf. "Ullman's Enzyklopadie der technischen Chemie", 4th Edition, Vol. 24, pages 601 et seq. and Winnacker-Kuchler, "Chemische Technologie", 3rd Edition, Vol. 6 (Metallurgie), pages 306 et seq.). After filtration, iron-containing precipitates such as these accumulate as filter cakes of high water content (approx 50%) and, depending on the quantity of heavy metal impurities present therein, have to be dumped at special dumps in accordance with legal and environmental requirements. Experience has shown that, for every metric ton of zinc metal produced hydrometallurgically, approximately 1 metric ton of iron-containing sludge has to be dumped.

Where the iron is precipitated as hematite, the product obtained contains no heavy metals other than iron. According to A. v. Röpenack, "Erzemetall" 35, 534 (1982), this product may be used in the production of steel and building materials. The disadvantage of precipitating iron by the "hematite process" lies in the cost of the process. The precipitation is carried out with pure oxygen at temperatures of at least 180° C. under a pressure of 15 bar.

Apart from the possibility of reusing the iron residues which only the "hematite process" affords, a search is being made on ecological grounds for processes in which few, if any, heavy-metal-bearing residues to be deposited on dumps are formed and in which the iron-containing fractions of the electrolyte solutions can be reprocessed. For some time, an alternaive to the precipitation processes discussed above has existed in liquid/liquid extraction processes by which the iron can be removed from zinc-containing electrolyte solutions and subsequently recovered. However, most of the processes suitable for the liquid/liquid extraction of iron from aqueous electrolyte solutions could not be implemented in practice, i.e. on an industrial scale, either due to the inadequate selectivity of metal separation or due to the inadequate chargeability of the organic phase at low pH values. The so-called "Espindesa" process is mainly used in practice (cf. A. J. Monhemius, "Topics in Non-Ferrous Extractive Metallurgy", R. Burkin (Ed.), pages 104 et seq; G. Thorsen, "Handbook of Solvent Extraction", T. C. Lo et al., 1983, pages 709 et seq.). In this process, an aqueous solution obtained from the leaching of ore with hydrochloric acid is first extracted with a secondary amine, to separate off the metals zinc, copper, cadmium and iron as chloro complexes. After a re-extraction stage with water, $Zn^{2+}$ and $Fe^{3+}$ are extracted with di-(2-ethylhexylphosphoric acid) (D-2-EHPA) in a following process step. First zinc and then iron may be separated off from the resulting solutions in two successive circuits; the two metals are then separately worked up in conventional extraction processes.

The disadvantage of the Espindesa process is that it is complicated by the multistep procedure involved both in the extraction and in the re-extraction using different extraction reagents. Accordingly, there has long been a need to provide new processes for the liquid/liquid extraction of iron from aqueous acidic solutions which do not have any of the above-described disadvantages of the prior art.

In addition, a process for the extraction of iron from zinccontaining aqueous electrolyte solutions using so-called "Versatic acids" is known from A. J. van der Zeeuw, "Hydrometallurgy" 2, 275 (1976) and from German Pat. No. 24 04 185. Before the extraction step, the organic phase containing Versatic acids is treated with roasted ore ("neutral leaching"), the zinc salt of the corresponding Versatic acid being formed. In the following extraction step, the aqueous iron-rich solution obtained from the digestion of the neutral leaching residues is brought into contact with the zinc-laden organic phase, $Zn^{2+}$ being exchanged for $Fe^{3+}$ in the Versatic acid salts. A considerable limitation is imposed by the fact that Versatic acids only begin to extract iron from the aqueous solutions at a pH value of 1.7, reaching their maximum load at a pH value of 2.6. This requires a considerable, undesirable reduction in the pH value which seriously restricts the scope of application of this extraction process.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide compounds, the use of which enables iron to be recovered by liquid/liquid extraction from electrolyte solutions containing other heavy metals in addition to iron, even at low pH values, with high charging of the organic phase with iron. In addition, the invention seeks to guarantee high selectivity of the extraction of iron in relation to the accompanying metals present. Another object of the invention is to enable the iron to be recovered as simply as possible from the organic extraction phase so that it may be reused, thus reducing the overall costs of the process.

The invention relates to the use of at least one citric acid partial ester corresponding to the following general formula

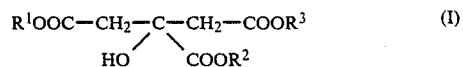

in which $R^1$, $R^2$ and $R^3$ represent hydrogen or a straight-chain or branched $C_4$-$C_{20}$ alkyl radical or a metal atom, with the proviso that at least one but at most two of the substituents $R^1$, $R^2$ and $R^3$ represent such an alkyl radical, for the extraction of iron from aqueous solutions.

Citric acid partial esters or mixtures thereof corresponding to general formula (I), in which $R^1$, $R^2$ and $R^3$ represent hydrogen or a straight-chain or branched $C_4$-$C_{20}$ alkyl radical or a metal atom, with the proviso that at least one but at most two of the substituents $R^1$, $R^2$ and $R^3$ represent one of the above-mentioned alkyl radicals, are used for the purposes of the invention. In one preferred embodiment, citric acid partial esters or mixtures thereof corresponding to general formula (I), in which at least one, but at most two of the substituents $R^1$, $R^2$ and $R^3$ represent a branched $C_4$-$C_{20}$ alkyl radical and the remaining substituent(s) represent(s) hydrogen or a metal atom, are used for the extraction of iron. Partial esters such as these containing branched alkyl radicals at one or two of the places denoted by $R^1$, $R^2$ or $R^3$ in general formula (I) normally show distinctly better solubility in organic solvents, which is why they are employed herein. Accordingly, suitable alkyl radicals in the citric acid partial esters corresponding to general formula (I) are straight-chain, but preferably branched alkyl radicals, and include butyl, pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl. It has been found in practice that branched $C_6$-$C_{13}$ alkyl radicals, i.e. branched hexyl, heptyl, octyl, nonyl, decyl, undecyl, dodecyl and tridecyl, are particularly suitable, i.e. citric acid partial esters corresponding to general formula (I), in which at least one, but at most two of the substituents $R^1$, $R^2$ and $R^3$ represent one of the above-mentioned branched $C_6$-$C_{13}$ alkyl radicals, can be used with particular advantage for the extraction of iron from aqueous solutions.

Particularly good results have been obtained by using citric acid partial esters or mixtures thereof corresponding to general formula (I), in which at least one, but at most two of the substituents $R^1$, $R^2$ and $R^3$ is/are a branched alkyl radical from the group 2-ethylhexyl, i-decyl, i-dodecyl and i-tridecyl; the most suitable citric acid partial esters from the group set forth above being those in which one or two of the substituents $R^1$, $R^2$ and $R^3$ represent(s) 2-ethylhexyl while the remaining substituent or the two remaining substituents represent hydrogen or a metal atom. This citric acid partial ester or mixtures of the mono- and diesters with 2-ethylhexyl as the alkyl radical in general formula (I) show(s) excellent solubility in the organic solvents used for extraction coupled with high selectivity for the extraction of iron from aqueous solutions. In addition, they show high chargeability with iron ions in the desired low pH-range which makes their use particularly preferable compared to other partial esters of citric acid or mixtures thereof.

The citric acid partial esters described both here and in the following which may be used in accordance with the invention in the extraction of iron from aqueous solutions either individually or in the form of mixtures of several such esters are prepared by methods known from the prior art, for example by reacting citric acid and one or more alcohols corresponding to the following general formula

$$R^4-OH \qquad (II)$$

in which $R^4$ is a straight-chain or branched $C_4$-$C_{20}$ alkyl radical, with one another at elevated temperature in the absence or in the presence of an organic solvent. The reaction is preferably carried out in the presence of an organic solvent, and preferably an organic solvent which forms an azeotropic mixture with water to remove the water of reaction formed during the esterification reaction from the reaction mixture at the boiling point of the azeotropic mixture, thus displacing the equilibrium of the esterification reaction in favor of the products. Suitable organic solvents of this type are, for example, aromatic hydrocarbons, preferably the xylenes boiling at temperatures above 140° C. The resulting citric acid partial esters and their mixtures are purified, again by known methods, freed from solvent residues, and used in accordance with the invention for the extraction of iron from aqueous solutions either individually or in admixture.

According to the invention, it is particularly preferred to use the citric acid partial esters or mixtures thereof corresponding to general formula (I), in which one of the substituents $R^1$, $R^2$ and $R^3$ is a metal atom, for the extraction of iron from aqueous solutions. Of the metal atoms, preferred are those which emanate from the group of acid-soluble non-ferrous metals present in recoverable quantities in the starting ores. In this preferred embodiment, therefore, citric acid partial esters or mixtures thereof corresponding to general formula (I) are used, in which one of the substituents is one of these acid-soluble non-ferrous metals which are present in recoverable quantities in the starting ores. Citric acid partial esters in which one of the substituents is a metal atom from the group zinc, cadmium, and copper are preferably used. Metal ions such as these are present in different quantities, depending on the origin, in minerals typically used for the recovery of zinc, but normally in such quantities that their recovery by the process described earlier is worthwhile. It is of advantage to use those citric acid partial esters in which one of the substituents $R^1$, $R^2$ or $R^3$ is a zinc atom. The use of citric acid partial esters such as these is of particular advantage because the extraction process represents an exchange between the citric acid partial esters dissolved in the organic phase and the metal ions present in the acidic aqueous phase. Where citric acid partial esters in which one of the substituents $R^1$, $R^2$ or $R^3$ is hydrogen are used (which is also possible in accordance with the invention), the hydrogen atom of the citric acid partial ester in the organic phase is exchanged for a metal ion from the aqueous phase. Accordingly, the aqueous phase becomes increasingly enriched with free $H^+$ ions, i.e. becomes increasingly acidic. To keep the pH value constant, therefore, it is of advantage to effect a metal-metal exchange by using the citric acid partial ester dissolved in the organic phase in the form of its metal salt, preferably its $Zn^{2+}$ salt. In that case, the actual extraction process lies in an exchange of the $Zn^{2+}$ ion of the citric acid partial ester in the organic phase for an $Fe^{3+}$ ion from the aqueous phase. Accordingly, there is no accumulation of protons in the aqueous phase and hence no significant change in the pH value to the detriment of the process. Instead, the $Zn^{2+}$ is advantageously enriched in the aqueous phase.

The "charging" of the citric acid partial ester, i.e. the organic phase, with $Zn^{2+}$ ions, i.e. the conversion of the free citric acid partial ester into its zinc salt, takes place in known manner, for example by so-called "neutral leaching" in which the citric acid partial ester dissolved in the organic extractant is treated with roasted ore, i.e. with metal oxides emanating from the roasting of the zinc-containing ores used as starting materials.

According to the invention, the above-mentioned citric acid partial esters corresponding to general formula (I) or mixtures thereof may be used for the extraction of iron from aqueous solutions in a preferably acidic pH range. However, a particular advantage of the present invention lies in the fact that the above citric acid partial esters or mixtures thereof advantageously extract iron even at decidedly low pH values, i.e. are suitable for the extraction of iron from relatively strongly acidic aqueous solutions. Thus, the present partial esters or mixtures thereof are suitable for the extraction of iron at pH values as low as 1.6 and even lower. The organic extractants containing the citric acid partial esters of general formula (I) or mixtures thereof used in accordance with the invention can be charged with an extremely large quantity of iron even at such low pH values. For solutions containing 0.5 mole of extraction reagent for example, the charging of the organic phase with iron reaches values of up to 9 g Fe per liter. The use of the partial esters or mixtures thereof is thus particularly preferred because both their selectivity and also their chargeability are distinctly greater than those of the other extracting agents known from the prior art.

Another advantage of using the citric acid partial esters corresponding to general formula (I) or mixtures thereof in accordance with the invention for the extraction of iron from acidic aqueous solutions is that the iron can be removed from the organic iron-containing phase separated off in the extraction process simply by reducing the pH value. Accordingly, the iron may be reextracted from the organic phase by addition of sulfuric acid. The iron may thus readily be recovered in relatively pure form and reused. This constitutes an advantage over the prior art insofar individual steps are avoided. As stated above, in the present as expensive process steps for "stripping" the iron in several process the iron can be re-extracted substantially quantitatively simply by adding acid.

Another advantage of using the citric acid partial esters corresponding to formula (I) or mixtures thereof for the extraction of iron from aqueous solutions is that the so-called "modifiers" normally used to improve phase separation behavior or kinetics are now no longer necessary. Where the citric acid partial esters used in accordance with the invention are added to the organic solvents typically used, optimal phase separation behavior dependent on the concentration used is observed. By virtue of the rapid kinetics of the extraction/re-extraction process, the equilibrium state is established after only a short time. In addition, the two phases show no tendency to form emulsions or a third phase containing the metal/extractant complex. These problems, which are normally alleviated by the addition of modifiers (such as nonylphenol or tridecanol for example), do not arise where the citric acid partial esters corresponding to general formula (I) or mixtures thereof are used in accordance with the invention. However, it is also possible in principle to use modifiers, as known from the prior art, although the phase separation of the individual phases is normally so good where the citric acid partial esters are used that there is no need for a modifier.

According to the invention, it is particularly preferred to use the citric acid partial esters corresponding to general formula (I) or mixtures thereof for the extraction of iron from acidic aqueous solutions using organic solvents or solvent mixtures. Solvents or solvent mixtures such as these are again known from the prior art for this purpose. They are normally aliphatic and/or aromatic hydrocarbons or hydrocarbon mixtures. For safety reasons, high-boiling hydrocarbons, i.e. hydrocarbons having a high flash point, or mixtures thereof containing more or less large proportions of aromatic hydrocarbons are normally used. For example, kerosenes of the type commercially available under the names Escaid TM, Solvesso TM and Kermac TM may be used as solvent mixtures. However, other hydrocarbons may also be used for the extraction process. For example, good results are also obtained with chlorinated hydrocarbons, such as trichloroethylene. The citric acid partial esters corresponding to general formula (I) or mixtures thereof, which are used in accordance with the invention, are miscible in any ratio with the above organic solvents. However, it has been found to be advantageous to use from 0.01 to 1.5 mole/l solutions of the citric and partial esters of formula (I) in the organic solvents, from 0.4 to 0.6 mole/l, and preferably 0.5 mole/l solutions being particularly suitable with respect to phase separation behavior and viscosity.

Another advantage of using the citric acid partial esters corresponding to general formula (I) and mixtures thereof in accordance with the invention is that these partial esters are sufficiently stable to hydrolysis in the strongly acidic pH range.

The invention is illustrated but not limited by the following Examples.

EXAMPLE 1

Preparation of a citric acid partial ester corresponding to general formula (I)

(I; $R^1 = R^3 =$ 2-ethylhexyl; $R^2 = H$)

576.3 g (3 moles) citric acid and 780.0 g (6 moles) 2-ethylhexanol (II; $R^4 =$ 2-ethylhexyl) were heated to 125°–170° C. with 400 ml xylene in a flask equipped with a water separator. 110 ml water were separated off during the esterification reaction. On completion of the reaction, most of the solvent was distilled off. 1.5 liters petroleum ether were added to the crude product which was then washed twice with 500 ml 10% sulfuric acid and then with 500 ml distilled water. The organic phase was freed from solvents at 80° to 90° C./approx. 2000 Pa pressure (water jet vacuum). A light yellow, viscous, clear liquid was obtained.

Yield: 1185 g (2.85 moles, corresponding to 95% of the theoretical yield).

Characterization:

The characteristic data of the purified reaction product are shown in Table 1 below.

EXAMPLE 2

The citric acid (isodecyl) partial ester (I; $R^1 = R^3 =$ isodecyl; $R^2 = H$) corresponding to the compound of Example 1 was prepared in the same way as described in that Example. The characterization of the product produced the values shown in Table 1 below.

TABLE 1

Characterization of the citric acid partial esters prepared in accordance with Examples 1 and 2 (calculated values in parenthesis).

| Property | Product of Ex. 1 | Product of Ex. 2 |
| --- | --- | --- |
| $n_D^{20}$ | 1.460 | 1.461 |
| Density (g · cm$^{-3}$) | 1.001 | 1.029 |
| Acid number (A.no.) | 101.7 (118.7) | 121.2 (134.9) |
| Saponification number (S.no.) | 342.6 (356.1) | 394.3 (404.6) |

EXAMPLE 3

To evaluate extraction under practical conditions, extraction isotherms (McCabe-Thiele diagrams) were recorded at various constant pH values. To this end, solvents (kerosenes, such as for example Escaid ™), in which the citric acid partial esters of general formula (I) prepared in accordance with Examples and 1 and 2 were dissolved (0.5 mole/l solutions), and standard electrolyte (composition: 80 g/l Zn, 21 g/l Fe, 7.2 g/l Mn, 0.6 g/l Cu and 0.2 g/l Cd; free sulfuric acid: approx. 40 g/l) were contacted with one another. The ratio of organic phase to inorganic phase (O/I ratio) was between 10:1 and 1:10. On completion of phase separation, the metal contents in the organic phase and in the aqueous were determined and plotted against one another in a graph.

Result

Figure 1:
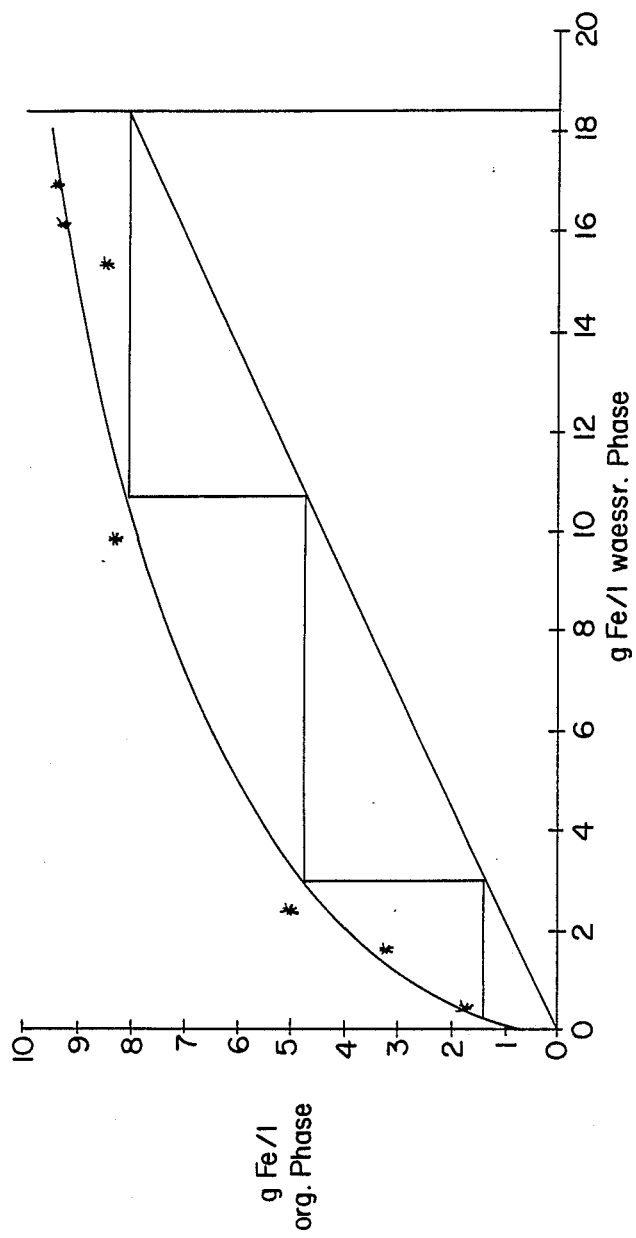
FIGS. 1 and 3 show the extraction isotherms obtained using the product of Example 1 (concentration: 0.5 mole in Escaid 100 ™) at a constant pH value of 1.6 (pH adjusted with NaOH), an O/I ratio of 2.3 and a starting concentration of 18.4 g Fe per liter aqueous phase.
Figure 2:
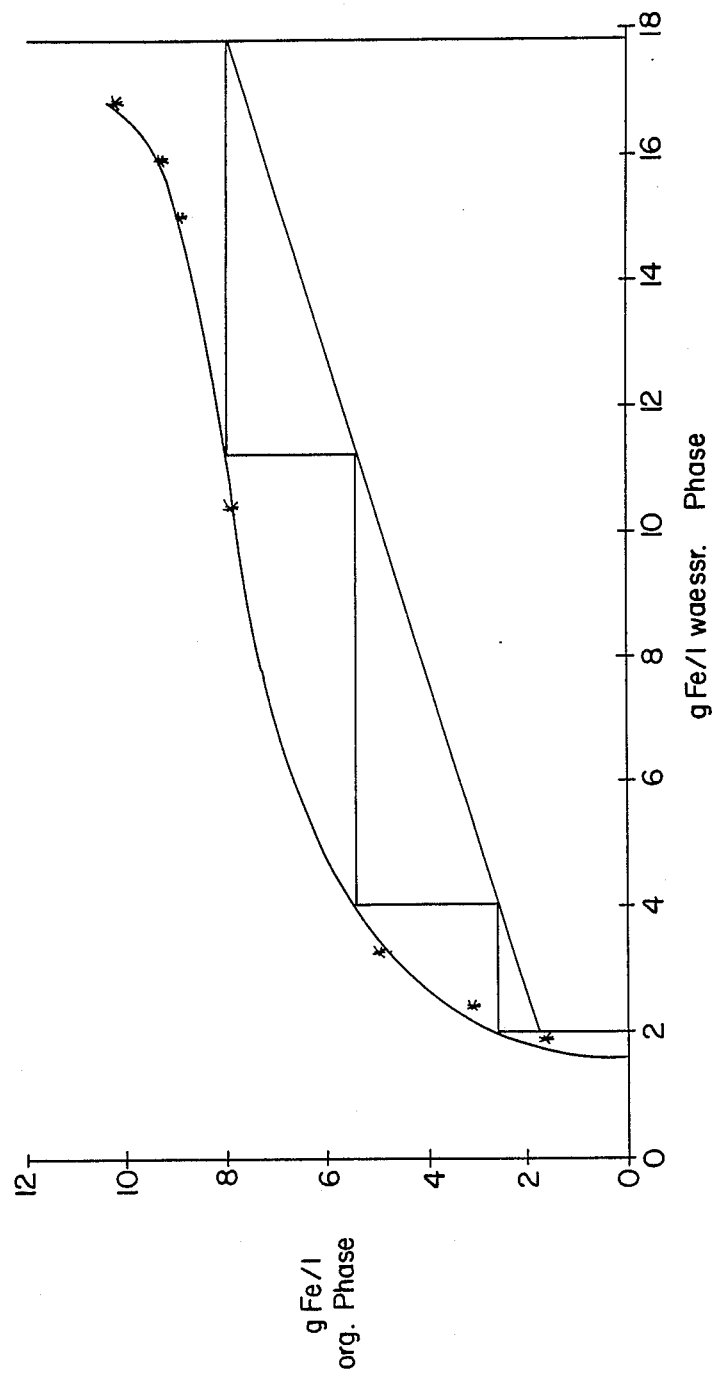
FIG. 2 shows the extraction isotherms obtained using the product of Example 2 (concentration: 0.5 mole in Escaid 100 ™) at a constant pH value of 1.6 (pH value adjusted with NaOH), an O/I ratio of 2.5 and a starting concentration of Fe of 17.8 g/l in the aqueous phase.

FIGS. 1 and 2 show that, for an O/I ratio of from 2.3 to 2.5, the Fe concentrations of the "standard electrolyte" could be reduced from around 18 g/l to around 1 to 2 g/l in three stages. The charged organic phase then had an Fe concentration of the order of 8 g/l which was near the upper limit of the observed maximum charging of the organic phase containing the particular citric acid partial ester corresponding to general formula (I).

EXAMPLE 4

The extraction tests of Example 3 were repeated at the O/I ratio of 1:1 using different reagent concentrations of the citric acid partial esters corresponding to general formula (I). The pH value was not kept constant during the extraction process. The in-use concentrations of the compound of Example 1 in Escaid 100 ™
  (a) 0.1 mole/l
  (b) 0.5 mole/l
  (c) 1.0 mole/l
  In addition,
  (d) 0.5 mole/l
of the compound of Example 1 in Escaid 100 ™ was used at a constant pH value of 1.6 for the purposes of limitaiton.

In none of the tests summarized in Table 2 was any zinc charge (<0.1 g Zn/l) observed in the organic phase. The variations in the concentration of zinc before and after the extraction process are attributable to the experiment.

TABLE 2

Extraction results (Example 4)

Conc. (g/l) of metal in the particular phase

| Ex. 4 | Aqueous phase before extraction | | Aqueous phase after extraction | | Organic phase | % Fe extr. |
| --- | --- | --- | --- | --- | --- | --- |
| | Zn | Fe | Zn | Fe | Fe | |
| (a) | 76.8 | 18.0 | 76.9 | 16.5 | 1.5 | 8.3 |
| (b) | 74.4 | 17.4 | 76.4 | 13.3 | 4.8 | 27.6 |
| (c) | 75.0 | 17.5 | 72.1 | 10.9 | 6.3 | 36.0 |
| (d) | 76.3 | 17.8 | 69.0 | 10.4 | 7.9 | 44.4 |

EXAMPLE 5

Figure 3:
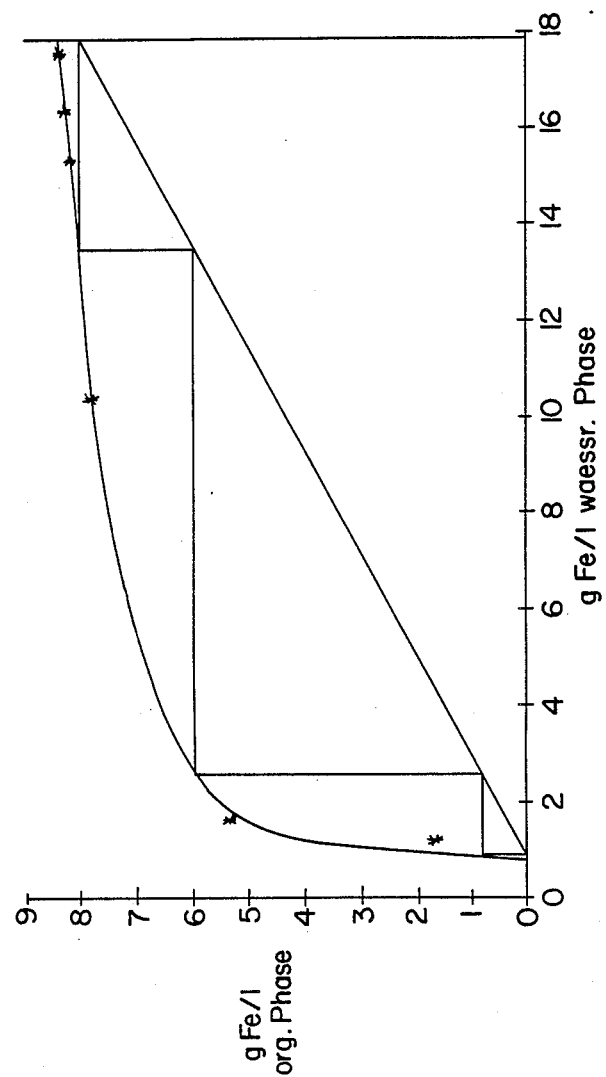

The shift in the pH value which normally occurs in Examples 3 and 4 during extraction of the iron and which is compensated by addition of sodium hydroxide is preferably avoided by charging the extractant, i.e. the citric acid partial ester, with $Zn^{2+}$ before extraction by treatment with roasted ore at a pH value of approx. 3.4 so that iron is exchanged for zinc and not for protons during the subsequent extraction. Accordingly, there is no need for the pH value to be further controlled. Before the actual extraction, therefore, the particular citric acid partial ester in which one of the substituents $R^1$, $R^2$ or $R^3$ is hydrogen is converted into the particular $Zn^{2+}$ salt in which the particular substituent then represents half an equivalent of $Zn^{2+}$ FIG. 3 shows the extraction isotherms of the partial ester of Example 1 charged before extraction with 12.8 g Zn per liter (concentration: 0.5 mole/l in Escaid 100 ™). The starting pH value was 1.6 and was not further corrected during the extraction process.

Result

Figure 4:
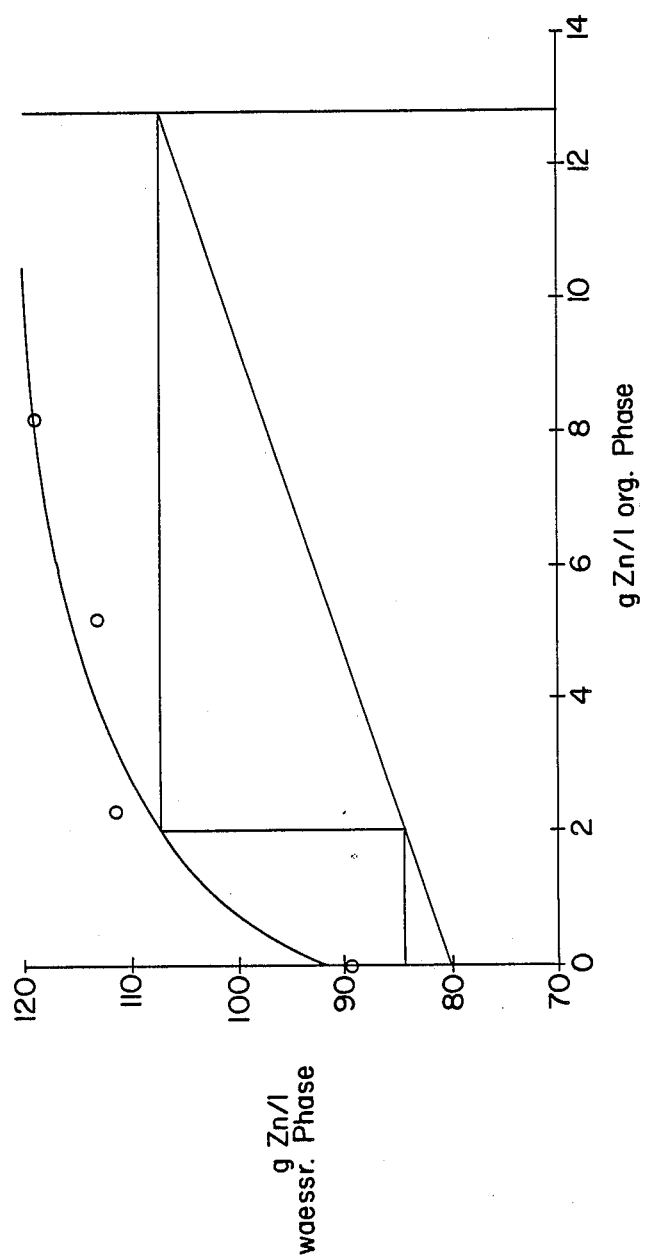
FIGS. 4 and 5 show re-extraction isotherms.

As can be seen from FIG. 3, the iron concentration of the standard electrolyte may be reduced in three steps from 17.8 g/l to around 0.7 g/l providing an O/I ratio of 2.5 is maintained. The organic Escaid ™ phase takes up 8 g iron per liter. The re-extraction isotherms for Zn (FIG. 4) recorded at the same time as the extraction isotherms show that the $Zn^{2+}$ in the extractant is completely exchanged for $Fe^{3+}$ under the described conditions. The Zn-free iron salt of the partial ester of Example 1 is obtained during the subsequent re-extraction step.

EXAMPLE 6

An organic phase charged with iron (compound of Example 1; concentration: 0.5 mole/l in Escaid 100 ™; pH=1.6, charged with 9.1 g Fe/l) was separated from the aqueous phase as described above and treated with sulfuric acid to re-extract the iron. The results are shown in Table 3 below.

TABLE 3

Re-extraction of the organic phase with $H_2SO_4$ (Example 6)

| Con. $H_2SO_4$ (mole/l) | Conc. of Fe in the organic phase after treatment with $H_2SO_4$ (g Fe/l) | % Re-extraction |
| --- | --- | --- |
| 0.1 | 7.2 | 21 |
| 0.5 | 3.5 | 62 |
| 1.0 | 1.8 | 80 |

EXAMPLE 7

Figure 5:
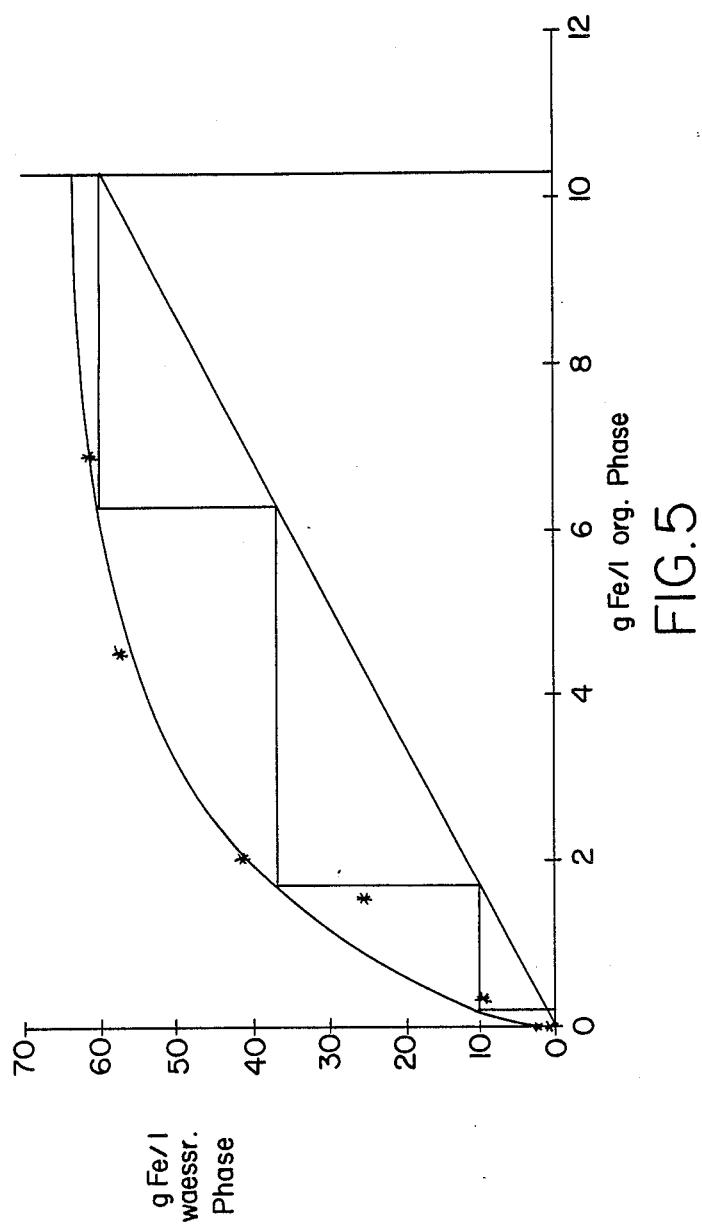

One example of a re-extraction isotherm is shown in FIG. 5. In the basic test arrangement, an organic phase charged with 10.3 g iron per liter (partial ester of Example 1; concentration: 0.5 mole/l in Escaid 100 TM, charged at pH 1.6; O/I ratio 5.8) was freed almost completely from iron in three steps with 2-molar sulfuric acid. Thereafter the concentration of iron in the resulting sulfuric acid aqueous phase was approximately 60 g iron per liter.

We claim:

1. A process for the extraction of iron from an aqueous solution in which iron ions are a component thereof comprising the steps of:
    A. contacting an aqueous solution containing iron ions with an organic extractant containing an iron extracting quantity of at least one citric acid partial ester of the formula $$R^1OOC-CH_2-\underset{\underset{COOR^2}{\diagdown}}{\overset{\overset{HO}{\diagup}}{C}}-CH_2-COOR^3 \quad (I)$$

in which $R^1$, $R^2$ and $R^3$ represent hydrogen or a straight-chain or branched $C_4$-$C_{20}$ alkyl radical or an acid-soluble non-ferrous metal atom, with the proviso that at least one but at most two of the substituents $R^1$, $R^2$ and $R^3$ represent such an alkyl radical, to extract iron from the aqueous solution; and
    B. separating the organic extractant from the aqueous solution.

2. The process of claim 1 wherein step A, one or two of the $R^1$, $R^2$, and $R^3$ groups represents a branched $C_4$-$C_{20}$ alkyl radical.

3. The process of claim 2 wherein one or two of the substituents $R^1$, $R^2$, and $R^3$ represents a branched $C_6$-$C_{13}$ alkyl radical.

4. The process of claim 1 wherein step A, one or two of the substituents $R^1$, $R^2$, and $R^3$ represents 2-ethylhexyl, i-decyl, i-dodecyl and i-tridecyl.

5. The process of claim 4 wherein one or two of the substituents $R^1$, $R^2$, and $R^3$ represents 2-ethylhexyl.

6. The process of claim 1 wherein the process is used to extract iron from an ore and wherein in step A, one of the substituents $R^1$, $R^2$, and $R^3$ is an acid-soluble nonferrous atom which is present in recoverable quantities in said ore.

7. The process of claim 6 wherein the metal atom is Zn, Cd, or Cu.

8. The process of claim 7 wherein the metal atom is Zn.

9. The process of claim 1 wherein the aqueous solution is an acidic solution.

10. The process of claim 1 wherein the aqueous solution is an acidic aqueous electrolyte solution.

11. The process of claim 1 wherein in step A the at least one citric acid partial ester is present in the organic extractant in a concentration of from about 0.01 to about 1.5 moles/l.

12. The process of claim 11 wherein the concentration is from about 0.4 to about 0.6 moles/l.

13. The process of claim 1 wherein step A, the organic extractant is at least one of an aliphatic hydrocarbon and an aromatic hydrocarbon.

14. The process of claim 1 wherein step A, the organic extractant is a chlorinated hydrocarbon.

15. The process of claim 14 wherein the chlorinated hydrocarbon is trichloroethylene.

16. A process for the extraction of iron from an aqueous solution in which iron ions are a component thereof comprising the steps of:
    A. contacting an aqueous solution containing iron ions with an organic extractant containing an iron extracting quantity of at least one citric acid partial ester of the fomula $$R^1OOC-CH_2-\underset{\underset{COOR^2}{\diagdown}}{\overset{\overset{HO}{\diagup}}{C}}-CH_2-COOR^3 \quad (I)$$

in which $R^1$, $R^2$ and $R^3$ represent hydrogen or a straight-chain or branched $C_4$-$C_{20}$ alkyl radical or an acid-soluble non-ferrous metal atom, with the proviso that at least one but at most two of the substituents $R^1$, $R^2$ and $R^3$ represent 2-ethylhexyl and one of $R^1$, $R^2$ and $R^3$ is Zn, to extract iron from the aqueous solution; and
    B. separating the organic extractant from the aqueous solution.

* * * * *